Sept. 16, 1924.
T. M. BRAGG
SPOTLAMP FOR AUTOMOBILES
Filed Feb. 26, 1924
1,508,772
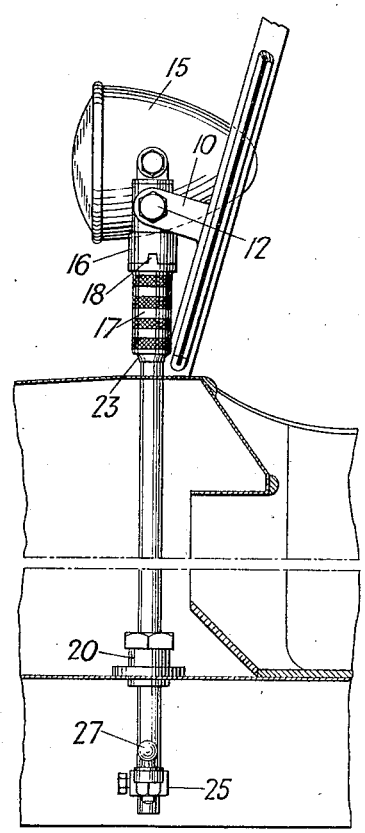
Fig. 2
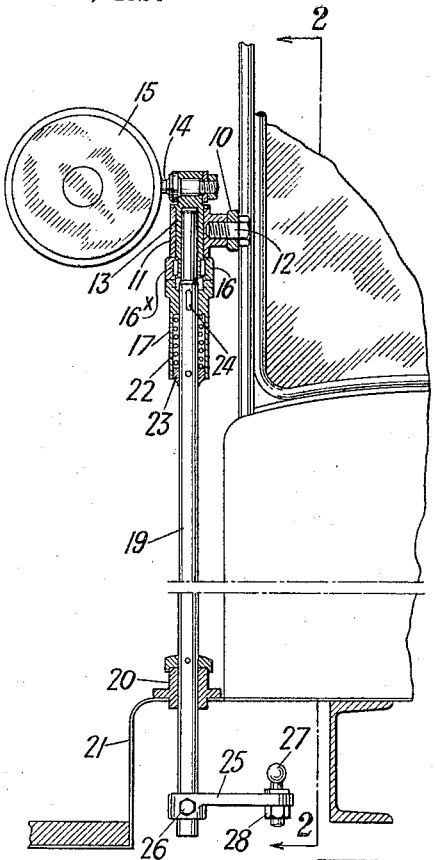
Fig. 1
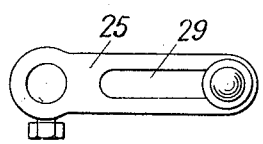
Fig. 4
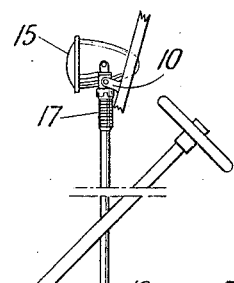
Fig. 3
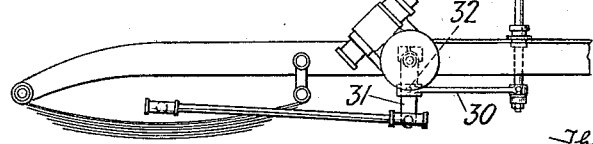
Inventor
Thomas Milton Bragg Patented Sept. 16, 1924.

1,508,772

UNITED STATES PATENT OFFICE.

THOMAS MILTON BRAGG, OF MUNGERIBAR, NEW SOUTH WALES, AUSTRALIA.

SPOTLAMP FOR AUTOMOBILES.

Application filed February 26, 1924. Serial No. 695,199.

*To all whom it may concern:*

Be it known that I, THOMAS MILTON BRAGG, subject of the King of Great Britain and Ireland, residing at Mungeribar, New South Wales, Australia, have invented new and useful Improvements in Spotlamps for Automobiles, of which the following is a specification.

This invention relates to "spot" lamps or "search" lamps for automobiles and consists in a lamp bracket with universal joints, adapted for carrying a lamp on automobile wind shield frames or similarly, so that the lamp may be adjusted at will by the driver of the car to direct the light beam towards whatever objective he may require to illuminate; and it consists in associating with such lamp brackets means for gearing the movable portion thereof to the steering assembly in such a way that the lamp will be partially rotated or swung about a vertical axis automatically to direct the light beam always ahead of the course of the car, with freedom to the driver to adjust the lamp's position in the bracket whilst the clutch is so engaged.

In the accompanying drawings—

Fig. 1 is a frontal sectional elevation showing a view of the lamp, its bracket, clutch, automatic control spindle, steering linkage gear; and a portion of the car;

Fig. 2 is a side elevational view showing as in Fig. 1 a portion of the car structure;

Fig. 3 is a side elevational view from within the car chassis; and

Fig. 4 is a plan view of a slotted arm which is carried on the foot of the automatic control spindle and is link connected to the throw arm of the steering gear of the car.

A bracket arm 10 is fixed to the wind shield stanchion and carries a T-head 11 on a pivot pin 12. A socket 13 is mounted rotatably in the arms of the T and carries in a transversely disposed hole in the top end of it a rotatable arm 14. The lamp body 15 is fixed to the outer end of this arm. The lamp may be freely swung in a vertical plane on the pivot arm 14 and in a horizontal plane on the socket 13. 16 is a collar which is fixed on the bottom end of the socket 13 by means of a ring or packing 16$^x$ which engages it to the socket frictionally. A key or fixed pin may be used instead of this ring or packing. This collar forms the female member of a dog clutch, the male member thereof being a long sleeve 17. 18 is one of the engaging dogs. The sleeve 17 is carried on the upper part of a vertically disposed spindle 19 which is rotatably mounted near the bottom end in any appropriate bearing 20 which may be carried on the metal valance 21, or otherwise on a frame bracket. At its top end the spindle 19 has a bearing in the socket 13. A helical spring 22 in compression is housed in an annular chamber in the sleeve 17; this spring takes abutment on a collar 23 which is pinned on to the spindle 19, and its top end bears upwardly, tending to force the sleeve upward and thus hold it engaged by the dogs 18 to the collar 16. 24 is a key fixed in the spindle 19 and engageable in a slot in the upper part of the sleeve 17. 25 is an arm secured by a screw pin 26 to the bottom end of the spindle 19. It carries a ball stud 27 adjustably fixed by a back nut 28 in a slot 29. The stud 27 is connected by a link 30 with the throw arm 31 of the steering gear by means of a pivot pin 32.

The details of the "universal" mounting of the lamp body on the bracket may be changed so long as a construction be used which permits manual adjustment of the lamp body in any plane thereby to enable the driver to direct the light beam towards any desired point.

The operation and use of the device is as follows—

When the sleeve 17 is in the higher position as shown in Figs. 1 and 2 the dog teeth 18 on the top end of it are engaged with the collar 16 through the frictional ring or packing 16$^x$. Rotational movements of the spindle 19 are transmitted through the sleeve, the dog clutch and the collar to the rotatable socket 13. The spindle 19 is rotated obediently to the movements of the steering gear through the arm 25 the spherical headed pivot pin 27 being set at a position in the slot 29 to arrange that the rotational movement of the spindle may be such as to swing the lamp in a horizontal plane to direct the light beam from it directly ahead of the car. When the car is proceeding on a straight course the steering gear is in the "square" position, and the lamp 15 is directed straight ahead. When the steering gear is moved to swing the car to left or right, the lamp is swung on the socket mounting in the bracket correspondingly, so that the beam is directed on to the path on which the car is about to travel.

When it is required to manipulate the lamp 15 independent of the automatic control arrangement, the sleeve 17 may be pushed downward so as to compress the spring 22, and then turned sufficiently to bring the key 24 out of alignment with the slots in the head of the sleeve in which normally it is engaged. The sleeve is thus held out of engagement with the collar 16 so that the clutch is then open. The lamp may then be handled by the driver in the same manner as a lamp mounted on conventional universal motion bracket.

Whilst the clutch is engaged the lamp may be moved manually to vary the direction of the beam in a vertical plane without affecting operation of the automatic arrangement which swings it in a horizontal plane only.

What I claim as my invention and desire to secure by Letters Patent is—

1. The combination of a vehicle lamp, a bracket having a bore, a socket member rotatably mounted in the bore, a lamp horizontally pivoted to one end of the socket member, a spindle projecting into the bore from the other end of the socket member, means connecting the spindle to the steering mechanism of the vehicle, a clutch collar fixed to rotate with the socket member, and a clutch sleeve surrounding and keyed to the spindle, and normally urged into engagement with the clutch collar to form a connection between the lamp and the steering mechanism whereby the lamp is automatically turned as the vehicle is steered, said clutch being adapted to be manually disengaged from the clutch collar when it is desired to adjust the lamp independent of the steering mechanism.

2. The combination of a vehicle lamp, a substantially T-shaped bracket having a bore in the head portion, the leg of the T-shaped bracket being positioned horizontally and provided with means to attach it to the windshield of a vehicle, a socket member rotatably mounted in the vertical bore in the head portion of the bracket, a lamp horizontally pivoted to the upper end of the socket member above the bore, a spindle projecting into the lower portion of the bore, means connecting the spindle to the steering mechanism of the vehicle, a clutch collar fixed to rotate with the socket member, and a clutch sleeve surrounding and keyed to the spindle, and normally urged into engagement with the clutch collar to form a connection between the lamp and the steering mechanism whereby the lamp is automatically turned as the vehicle is steered, said clutch sleeve being adapted to be manually disengaged from the clutch collar when it is desired to adjust the lamp independent of the steering mechanism.

In testimony whereof I affix my signature.

THOMAS MILTON BRAGG.